United States Patent [19]

Skaggs et al.

[11] Patent Number: 4,734,774
[45] Date of Patent: Mar. 29, 1988

[54] CCD IMAGER VIDEO OUTPUT DEFECT COMPENSATION

[75] Inventors: Frank L. Skaggs, Dallas; Stanley W. Holcomb, Richardson, both of Tex.; Benny R. Baker, deceased, late of Albuquerque, N. Mex.; Patricia J. Peterson, heir, Sacramento, Calif.

[73] Assignee: Texas Instruments Incorporated, Dallas, Tex.

[21] Appl. No.: 677,320

[22] Filed: Dec. 3, 1984

Related U.S. Application Data

[63] Continuation of Ser. No. 522,541, Aug. 10, 1983, abandoned, which is a continuation of Ser. No. 292,757, Aug. 14, 1981, abandoned.

[51] Int. Cl.$^4$ ................................ H04N 9/07
[52] U.S. Cl. .................... 358/213.15; 358/213.17; 358/44
[58] Field of Search ............... 358/44, 21 R, 163, 167, 358/213, 213.15, 213.17

[56] References Cited

U.S. PATENT DOCUMENTS

| | | | |
|---|---|---|---|
| 3,869,567 | 3/1975 | Covington | 358/163 |
| 3,904,818 | 9/1975 | Kovac | 358/213 |
| 4,175,268 | 11/1979 | Ochi et al. | 358/44 |
| 4,193,093 | 3/1980 | St. Clair | 358/163 |
| 4,232,340 | 11/1980 | Fuhrer | 358/167 |
| 4,253,120 | 2/1981 | Levine | 358/163 |

Primary Examiner—Michael A. Masinick
Attorney, Agent, or Firm—Carlton Hoel

[57] ABSTRACT

Erroneous data in the video pulse output string of a CCD imager, caused by defective cells in the imager, is detected by comparison with adjacent data in the string and corrected by replacement with adjacent data. CCD video output is delayed by one clock cycle, then compared to the real time video output while both signals are still on the chip. If the delayed pulse is the same or greater magnitude as the real time pulse, that pulse goes on as part of the video output. If the delayed pulse is less than the real time pulse by a defined amount or more, then the real time pulse is replaced in the output by a copy of the following real time data pulse.

6 Claims, 5 Drawing Figures

CCD IMAGER VIDEO OUTPUT DEFECT COMPENSATION

This application is a continuation of application Ser. No. 522,541, filed Aug. 10, 1983, which is a continuation of Ser. No. 292,757, filed Aug. 14, 1981, both now abandoned.

BACKGROUND OF THE INVENTION

This invention relates to charge coupled device imager video outputs, and more specifically to a method for correcting those output signals which are generated by defective cells in the CCD imager.

Recently, much effort has been devoted to the advancement of the field of image sensing devices. Self-scanned charge transfer arrays, both charge-coupled and bucket-brigade types, and X, Y addressed photodiode arrays have been the object of much of this effort. One of the barriers to low cost production of these imager chips is the presence of defective individual cells in the array. The signal from a defective cell will differ greatly from a properly functioning cell, and when processed and displayed, will be evident.

Since large arrays are commercially desirable, but not feasible at a competitive price, other alternatives to solve the problem of less than 100% yields were investigated. One approach to the solution of the problem is given in U.S. Pat. No. 3,904,818. In this patent, the problem addressed is that of "white video defects". The white video defects are said to be caused by dark current spikes, and removal of the signals caused by the spikes is taken care of by an algorithm which replaces any defect signal with a signal equal to the average of the signals adjacent to the defect signal. A significant problem with this method is that of delay. Signals must be delayed two clock cycles in order to accomplish the averaging process and replace a defect signal.

SUMMARY OF THE INVENTION

The present invention discloses a method of compensating for defects in a CCD imager output, due to defective cells in the array, by comparing adjacent cell outputs. The outputs of two properly operating adjacent cells will typically have a very small signal output magnitude difference. If adjacent cell outputs are compared, then defective cell outputs can be identified and the video output compensated for the defective cell output. This allows use of imager arrays that are less than 100% good, greatly reducing the cost. Also, the present invention delays the output video only one clock cycle for analysis and compensation.

In the preferred embodiment of the present invention, one aspect of the invention provides a CCD imager chip having added circuitry on the periphery of the chip to perform signal analysis and correction.

To accomplish this analysis and correction, a circuitry-implemented algorithm detects and corrects invalid data present in the signal output from a CCD imager array column. The algorithm is as follows:

For a pulse string such as

If $b \leq (1+\alpha)a$, use b
If $b \geq (1+\alpha)a$, use c for b

This algorithm has the effect of limiting the difference in magnitude between two adjoining pulses to a constant ($\alpha$). If two or more adjoining cells are defective, the rate of change is still incremental.

In another embodiment of the invention, optical filters are used to pass certain colors onto designated rows of sensors in the array. In this way, the output video is color encoded. For example, every other pulse may represent red light, and the other pulses represent blue light. In order to accomplish the correct grouping of signals and defect compensation, the delay is required to be two clock cycles. This allows the color signals to be compared with signals representing the same color. Also, in this embodiment, the CCD serial output must go directly to two floating gate amplifiers sequentially. The floating gate amplifier outputs are buffered and go to a comparator where the magnitudes are compared. An error signal is generated if needed and is delayed so that it arrives at the proper switch at the proper time.

DETAILED DESCRIPTION OF THE INVENTION

Figure 1:
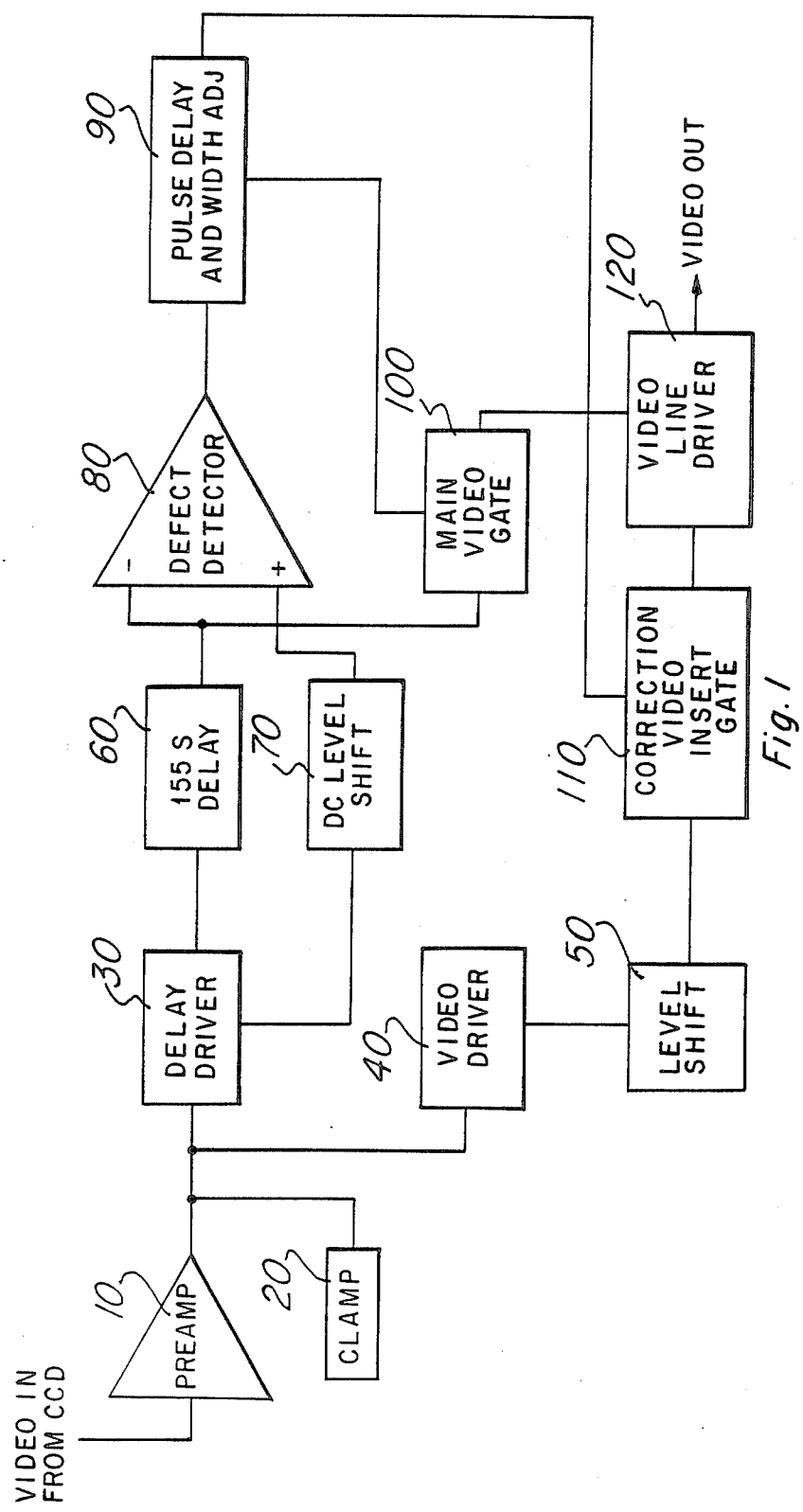
FIG. 1 is a block diagram of a discrete component implementation of the algorithm for a single clock cycle delay application.

Referring now to FIG. 1, there is provided a video preamplifier 10 whose output is clamped by clamp circuit 20. The clamped output is coupled to delay driver 30, and video driver 40. The output of the delay driver 30 is coupled to both a 155 ns delay circuit 60 and a level shifter circuit 70. The output of the video driver goes to a level shifter 50 which furnishes video signals to a video correction gate 110. The outputs of delay line 60 and level shifter 70 are applied to the inverting and non-inverting inputs of defect detector 80. If the signal difference is greater than a reference, then an output trigger pulse is generated. The trigger pulse is coupled to the input of delay and width adjustment circuit 90. The gating pulse is delayed an appropriate amount of time, and the complementary outputs are connected to the gate inputs of the main video gate 100 and video correction gate 110. The outputs of both the main video gate 100 and video correction gate 110 are coupled to the input of video line driver 120.

Figure 2:
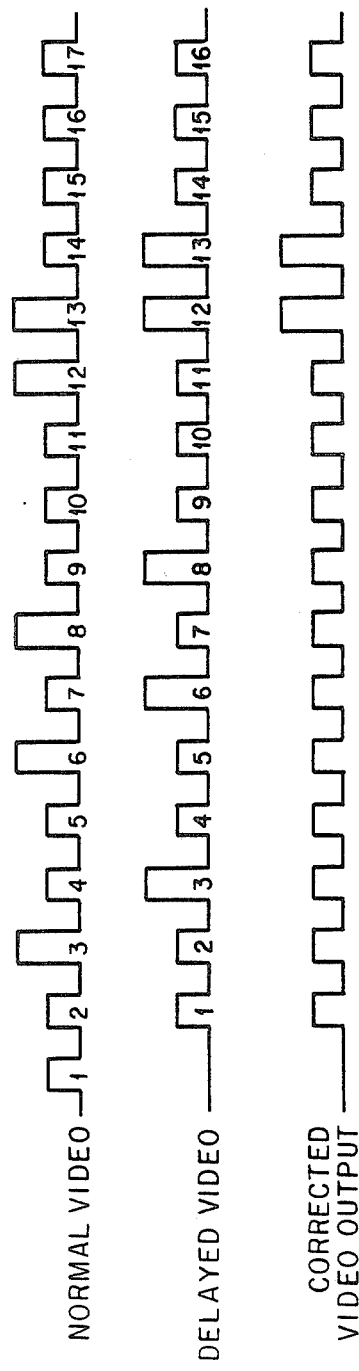
FIG. 2 is a diagram showing the waveforms as they would appear at certain points in the circuitry of FIG. 1 during processing of video pulses.

In FIG. 2, there is shown video waveforms as might be seen in an array and compensation circuit such as in the present invention. The "normal" video represents the real-time output of a CCD array. The "delayed" video represents the real time video which has been delayed one clock cycle so that it is easily compared to the real-time video. This way, implementation of the algorithm for defect analysis and correction is facilitated. The corrected video output is the video signal actually output to circuitry for processing and display. Since the video is delayed to compare each signal with the one following, the corrected output is delayed one clock cycle from the real time output of the imager, thereby losing the first signal of each column.

Figure 3:
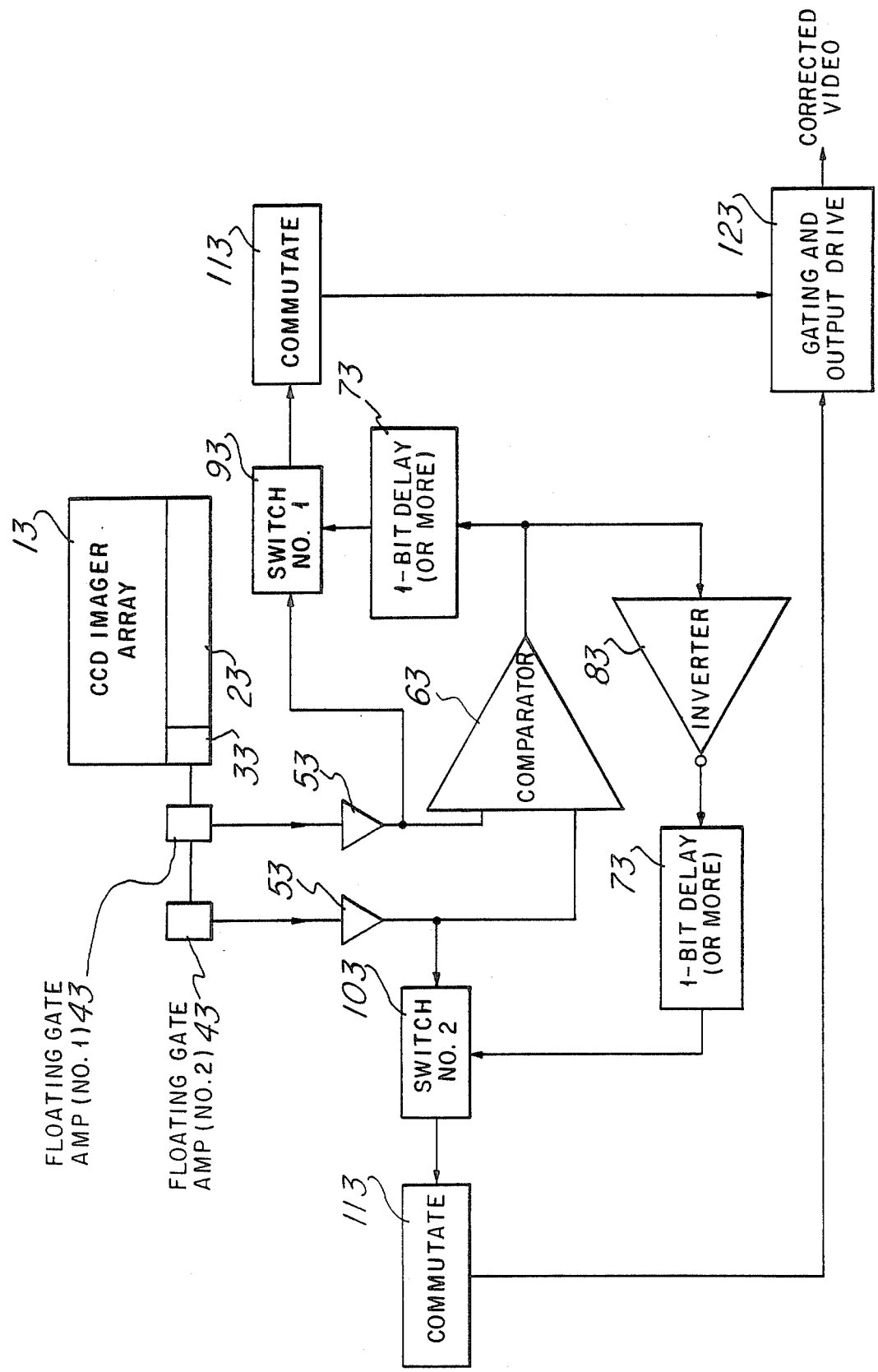
FIG. 3 is a block diagram of the defect composition for an encoded image array output.

FIG. 3 is a block diagram showing an encoded CCD which uses optical filters to pass certain colors of light to certain groups of sensors in the array. The array is arranged so that alternate sensors see different colors of light. When the array is read out, each signal must be delayed two clock cycles in order to be compared to signals of the same color. As shown in the diagram of FIG. 3, the output of an imager array 13 is collected in a serial output register 23. In the color-encoded imager array 13, the output stage 33 of the serial output register 23 is coupled to floating gate amplifier (#1) 43. The signal output is delayed two clock cycles before reaching floating gate amplifier (#2) 43. In an imager not color-encoded, the delay between floating-gate amplifiers #1 and #2 would be only one clock cycle. The output of each amplifier is fed to buffer amplifiers 53, whose outputs are coupled to both a comparator 63 and a switch circuit 93, 103. The comparator 63 detects signals from defective sensors and generates a signal when this occurs. The signal is passed along to one bit delays 73, with one signal being inverted in inverter 83. After delay, the comparator signals are applied to switches (#1) 93, (#2) 103. The switches pass selected the video signals to commutator circuits 113. The commutated video is then recombined in gating and output drive circuit 123 to be processed and displayed.

Figure 4:
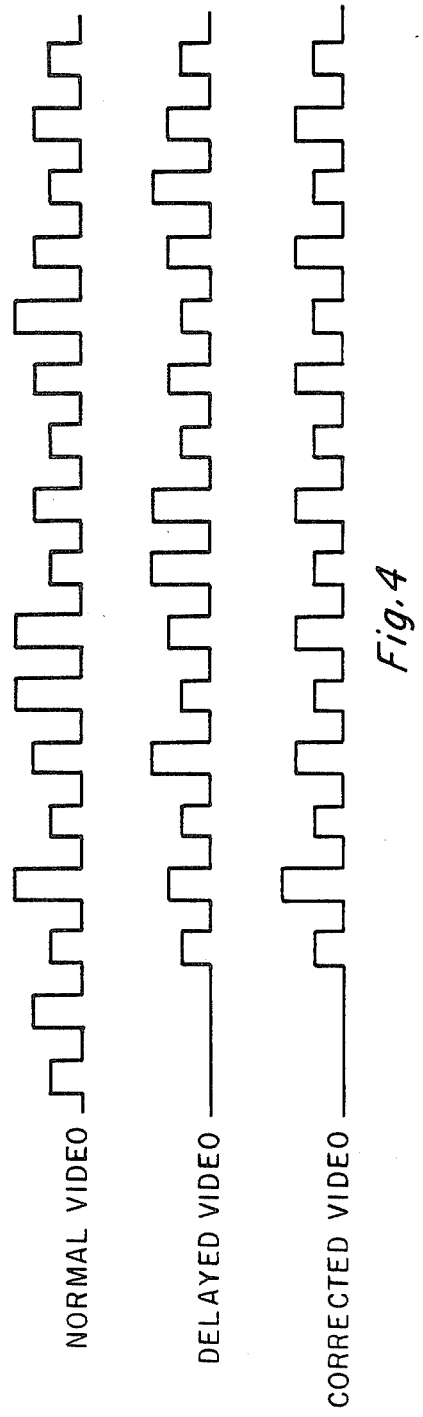
FIG. 4 shows the relationship of normal, delayed, and corrected video waveforms of the encoded array.

FIG. 4 shows video waveforms in an encoded CCD. In this embodiment, the video is delayed two clock cycles, and therefore the output video is delayed two clock cycles.

Figure 5:
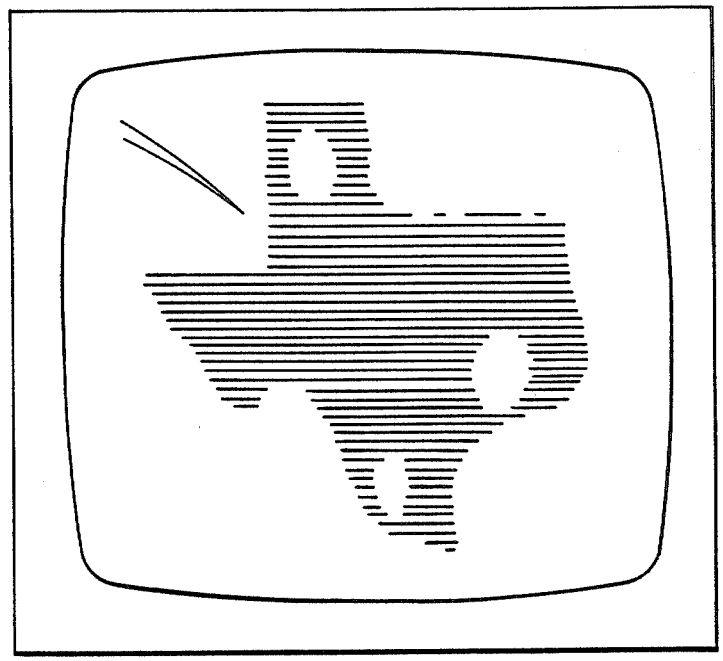
FIGS. 5 and 6 show actual test results from a CCD array before and after defect compensation.
Figure 6:
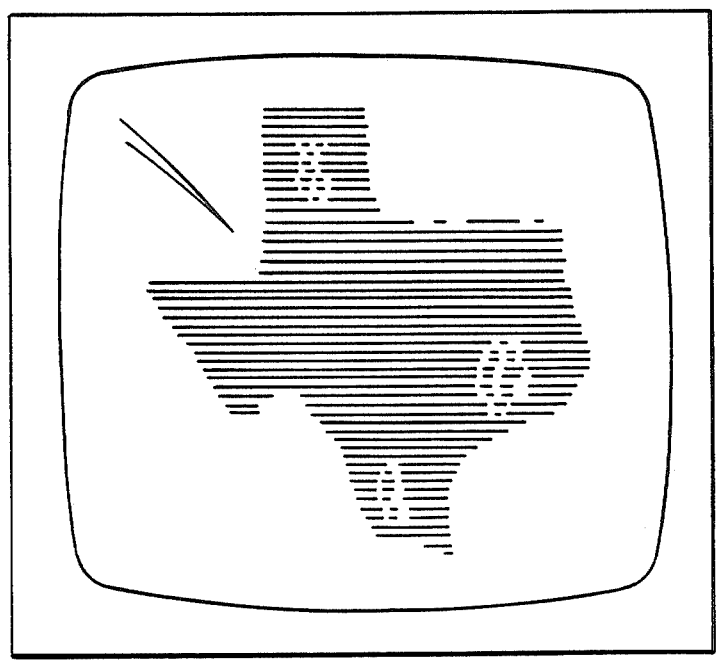

FIGS. 5 and 6 show the significant results that the defect compensation circuit has on a CCD array output. These reproductions of actual displays show the marked improvement of the display from a CCD array having serious defects. FIG. 6 shows that only the largest of the defective areas remain easily seen on the display after the video has been defect compensated.

The displays shown are taken from a CCD array of 246 vertical lines and 338 pixels in each column. The display not having defect compensation has numerous areas of "white video" caused by defective sensors. The display having a defect compensation circuit in the video processing circuitry shows the relative defect freedom after defect compensation as performed by the present invention.

The present invention has a distinct advantage in the fact that the detection of, and compensation for, signals from defective cells may be accomplished with only one clock cycle delay, except for encoded arrays, where the delay is two clock cycles. The implementation of the defect compensation circuitry on the same chip with the CCD array as in the preferred embodiment of the present invention has a definite economic advantage in that the yield of devices in the CCD array can be considerably less than previously possible and the device still able to be made use of, except in the case of large areas of defective cells. This allows application of CCD imager arrays to many projects heretofore not feasible because of the need for high quality video at low cost. Additionally, in the encoded array embodiment, two adjacent defective signals can be corrected.

What is claimed is:

1. A system for detecting, in the video output of a CCD imager array, pixel signals which are generated by defective sensors in said array, and for compensating said video output to restore said video output to a state closely approximating the video output from a defect-free imager array, comprising:
    delay circuit means for delaying said video output;
    comparator circuit means for comparing said delayed video to real-time video and for identifying each pixel signal value of said real-time video output as defective if and only if each said pixel value exceeds the preceeding pixel value by more than a predetermined percentage, and
    correction circuit means for inhibiting said defective pixel signals from becoming part of corrected video, and for inserting in place of each defective pixel signal, a pixel signal from an adjacent good sensor.

2. A system as in claim 1, wherein said circuit means for delaying said video output actually delays video output only one clock period from real time.

3. A system as in claim 1, wherein said circuit means for delaying said video output actually delays video output two clock periods from real time.

4. The system of claim 1, wherein all of said circuit means are integrated on a single chip with said CCD imager array.

5. A semiconductor imaging system as in claim 4, further comprising a dichroic light filter situated over said imaging device for reflection of colors of light except that color passed by said filter.

6. A semiconductor imaging system as in claim 4, further comprising a dichroic light filter constructed with stripes of filter material for passage of a certain color alternated with stripes of filter material for passage of another color, such that certain groups of sensors in said array see only certain colors of light.

* * * * *